United States Patent
Elsbett et al.

[11] 3,730,163
[45] May 1, 1973

[54] PISTON FOR INJECTION TYPE INTERNAL COMBUSTION ENGINES

[75] Inventors: Gunter Elsbett; Ludwig Elsbett, both of Hilpaltstein, Germany

[73] Assignee: Maschinenfabrik Augsburg-Nurnberg Aktiengesellschaft Werk Nurnberg, Nurnberg, Germany

[22] Filed: Apr. 7, 1971

[21] Appl. No.: 132,094

[30] Foreign Application Priority Data

Apr. 7, 1970 Germany...................P 20 16 386.4

[52] U.S. Cl...................123/193 P, 92/213, 92/224, 123/32 B, 123/41.35
[51] Int. Cl.............F02f 3/02, F02f 3/14, F02f 3/26
[58] Field of Search.......................123/193 P, 32 B, 123/32 C, 41.35, 191 SP; 92/213, 214, 108, 224

[56] References Cited

UNITED STATES PATENTS

| | | |
|---|---|---|
| 2,832,325 | 4/1958 | Liebel.................123/32 B |
| 2,865,346 | 12/1958 | Liebel.................123/32 B |
| 2,870,754 | 1/1959 | Morris................123/32 B |
| 2,873,727 | 2/1959 | Meurer...............123/32 B |
| 2,942,591 | 6/1960 | Meurer...............123/32 B |
| 3,221,722 | 12/1965 | Bachle................123/41.35 |
| 3,251,349 | 5/1966 | Isley..................123/193 P |
| 3,402,644 | 9/1968 | Geiger et al.........92/224 |

FOREIGN PATENTS OR APPLICATIONS

| | | |
|---|---|---|
| 551,993 | 11/1956 | Belgium..............123/32 B |
| 1,288,819 | 2/1962 | France................123/32 B |
| 1,122,325 | 1/1962 | Germany............123/32 B |
| 1,157,428 | 11/1963 | Germany............123/32 B |
| 553,161 | 12/1956 | Italy...................123/32 B |

Primary Examiner—Wendell E. Burns
Attorney—Walter Becker

[57] ABSTRACT

A piston for injection type internal combustion engines, which has the bottom surface forming part of the main combustion chamber provided with a piston chamber in which an insert member defining a supplemental combustion chamber is inserted while an intermediate member is interposed between said insert member and the piston body portion defining said piston chamber, said intermediate member having zones of constant or different thermal conductivities according to a predetermined heat pattern.

11 Claims, 2 Drawing Figures

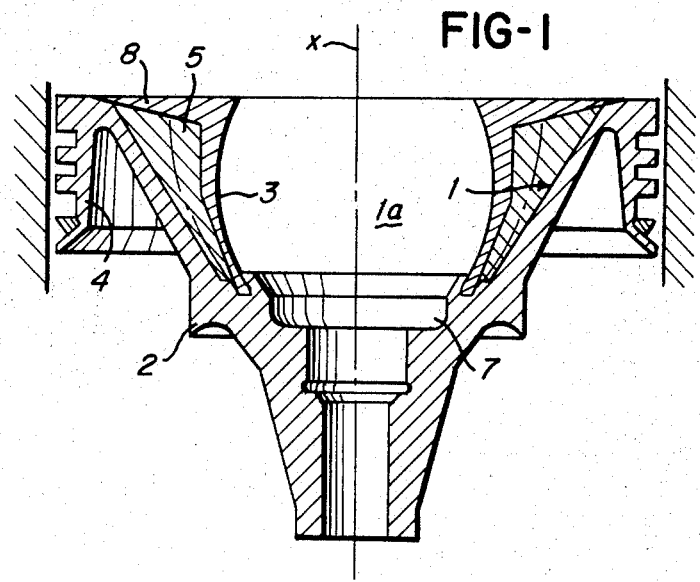
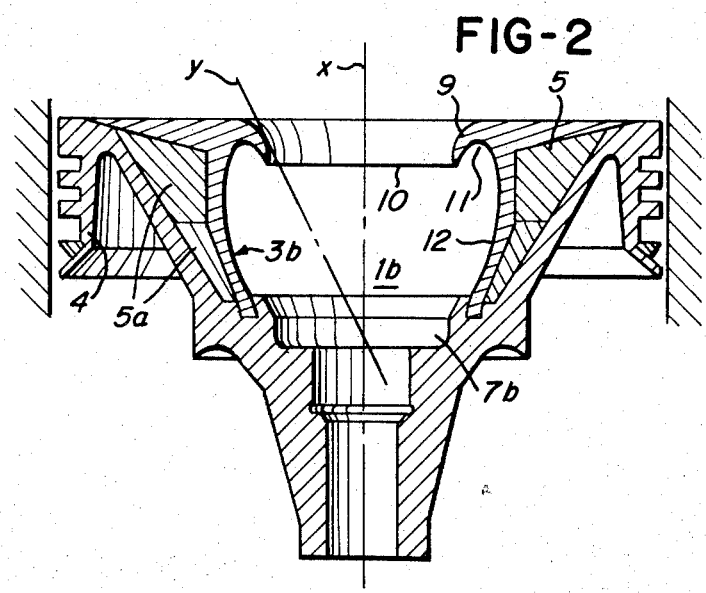
INVENTORS
GÜNTER ELSBETT
LUDWIG ELSBETT

PISTON FOR INJECTION TYPE INTERNAL COMBUSTION ENGINES

This invention relates to an improved piston for injection-type internal combustion engines, in particular Diesel engines, having an insert in the combustion chamber designed to retain unburned fuel particles.

It has long been the aim of engine designers and, in particular, Diesel engine designers, to ensure a complete combustion of the fuel introduced into the combustion chambers in order in this manner to prevent toxic and/or obnoxious exhaust emissions. Complete combustion is understood to be a process which after the energy process conversion will leave only inert substances that will not undergo any further reactions. In order that this may be achieved, it is important that the fuel and all fuel constituents contained in it are burned in the combustion spaces at such an optimum temperature as will positively ensure oxidation and inertization of all fuel constituents. However, maintaining an optimum temperature frequently fails because, on the one hand, the engines are rarely operated at a constant speed and, consequently, constant load, while, on the other hand, control of the temperatures in the combustion chamber by its walls is not load-dependent or temperature-dependent respectively.

With a view to achieving control of the temperature in a combustion chamber according to a predetermined heat distribution pattern in spite of the fluctuating load of the engine, combustion chambers of the spherical type have been provided with a cavity into which a fluid is injected at a rate which is varied according to the desired degree of temperature control of the combustion chamber. This fluid enters the cavity at one point and leaves the cavity at another point. This known arrangement has the drawback that non-uniform temperature control of the combustion chamber wall occurs because the fluid introduced undergoes a temperature change between the entrance into the cavity and its exit and, apart from that, fuel constituents tend to condense on the colder portions of the combustion chamber wall. Condensation of these fuel constituents prevents complete combustion and, as a result, obnoxious emissions are liable to result.

According to another known method of controlling the temperature of the combustion chamber in the piston, the combustion chamber is surrounded by a number of chambers containing substances designed to provide temperature control of the combustion chamber walls. These chambers, which may for instance be cylindrical and may be arranged around the longitudinal axis of the piston are filled only partly with the respective substance, leaving space for its expansion. The substance may consist, inter alia, of metals that are liquid when hot and form an efficient heat transmission agent in this state, whereas in the cold state they may also be liquid, such as mercury, or solid such as sodium. It is considered to be a drawback of this method of temperature control that producing the chambers around the combustion chamber involves a very high amount of labor, due to the fact that the individual chambers have to be made individually and have to be filled and sealed individually. In addition thereto, between the chambers there remain ribs around the combustion chamber which will not, or only partly, be influenced by the temperature control of the substance. A further drawback may be seen in the fact that when the engine is in a tilted position, the temperature distribution pattern will change inasmuch as the liquid substance will wander according to the tilted position of the engine to provide temperature control, i.e., cooling, for portions of the combustion chamber wall that may not require cooling so urgently as other portions of the wall at the opposite side and vice versa.

Another known method of controlling heat dissipation from the combustion chamber of an internal combustion engine consists in having a spherical combustion chamber partly surrounded by a ring-shaped insert embedded in the piston head. Covering part of the combustion chamber wall, this ring insert, which alternately serves to dissipate heat from the combustion chamber or prevent dissipation from it, consists of a substance the thermal conductivity of which increases as its temperature increases and, conversely, decreases as its temperature decreases, such as for instance, chrome nickel steel with 18 percent chromium content and 8 percent nickel content. While this ring insert does in fact provide a certain measure of temperature control of the combustion chamber and, consequently, of its walls, it is not possible with this method to prevent unburned fuel constituents from leaving the combustion chamber as these are drawn out of the combustion chamber during the power stroke of the engine.

In order to be able to regulate temperature control of the combustion chamber in the piston of a compression ignition engine according to an optimum heat distribution pattern, it has also been proposed to install an insert in the combustion chamber in the piston and to provide this insert with a baffle at its end facing the cylinder extending towards the axis of rotation of the combustion chamber (this being formed in the shape of a solid of revolution). The baffle is provided with a rim extending towards the axis of the combustion chamber in a manner that a straight line tangent to its rim will intersect the axis preferably near the bottom of the combustion chamber. The provision of the insert with a baffle causes fuel constituents, which enter the combustion chamber with a swirling motion and are deposited due to the centrifugal action on the walls of the insert, to be retained in the combustion chamber until they have been heated to such an extent as to cause optimum oxidation and elimination of obnoxious emissions from the combustion chamber in the piston. In order to bring about such optimum oxidation of the fuel constituents retained, these constituents are allowed to leave the combustion chamber only after passing the rim of the baffle with the result that, as the combustion gases flow past the baffle rim, these fuel constituents are exposed to considerable heating by the very hot baffle rim. Owing to the primary heating of the fuel constituents on the insert surfaces and subsequent heating at the rim of the baffle, any entrained unburnt constituents will be heated to the necessary high temperature and completely burnt. With a view to ensuring efficient combustion which is the sole factor controlling obnoxious emissions and what is commonly called "blue smoke," it is an advantage if, in addition to the baffle, means are provided for temperature control of the insert.

It is an object of the present invention to provide control of the temperature of the insert placed in the combustion chamber so that its walls will have the necessary temperatures in the various zones of the combustion chamber for efficient combustion to result.

In a piston of the above described type, this object has been realized by providing an intermediate member having locally constant or varying thermal conductivities between the insert and the ring groove portion of the piston so as to provide temperature control of the combustion chamber according to a preset heat distribution pattern.

For ease of production, it will be an advantage according to a further feature of the invention to compose the intermediate member of at least two ring-shaped members, the one controlling the combustion chamber bottom having a high or intermediate thermal conductivity and the other controlling the baffle having a low thermal conductivity.

According to yet another feature of the invention, the intermediate member may be split along the contour of the insert with the part of the intermediate member facing the combustion chamber having a high thermal conductivity whereas the parts of the intermediate member adjacent to the piston crown have a low thermal conductivity.

The invention is illustrated by way of example in the accompanying schematic drawing, in which:

FIG. 1 shows the piston head with a spherical combustion chamber and an insert provided in this combustion chamber; and FIG. 2 shows a piston head with a spherical combustion chamber and an insert provided in it formed with a baffle around its throat and an intermediate member placed between said insert and the ring-groove portion of the piston.

The conical chamber 1 of a piston 2 for internal combustion engines, in particular compression ignition engines, is provided with an insert 3 lining the inner wall surface of an intermediate member 5 inserted in said chamber 1 and interposed between the latter and said insert 3. The inner surface of insert 3 defines the spherical combustion chamber 1a of the piston 2. Both the insert 3 and the intermediate member 5 take the shape of annular solids of revolution and are attached to the piston head in a manner that they form the wall of the spherical combustion chamber 1a in the piston 2.

In accordance with the embodiment illustrated in FIG. 1, the insert 3 is formed with a large throat area through which the combustion chamber 1a communicates with the cylinder space. The intermediate member 5, provided between the insert 3 and the body of the piston 2, decreases in thickness from the top downwards and is supported with its thin end at the bottom 7 of the combustion chamber 1a. The throat end of the intermediate member 5 is covered by a ring flange 8 of the insert 3 which is connected to the body 4 of the piston 2 in any suitable standard manner. Depending on the desired heat distribution pattern in the combustion chamber 1a and, consequently, in the combustion chamber walls, the intermediate member 5 may be of a material having a high, low or intermediate thermal conductivity. In order to meet this requirement, the intermediate member 5 is preferably made of carbon substance which by transformation into graphite can be readily provided with different degrees of thermal conductivity. The transformation of the carbon into graphite may be effected by heating the carbon, when graduated heating will provide the desired graphite structure. For ease of production, it may be an advantage to design the intermediate member as composed of two ring-shaped sections, each section being provided with the necessary thermal conductivity. For instance, the lower part may have a high thermal conductivity, whereas the upper, i.e., the part adjacent to the piston crown, may have lower thermal conductivity. The interface between the substances of high and low thermal conductivities naturally need not lie in a horizontal plane, in fact, any desired zoning can be adopted in the intermediate member 5.

The embodiment illustrated in FIG. 2 differs from the one shown in FIG. 1 primarily in that the insert 3b is provided with a baffle 9 around its throat, the rim 10 of said baffle being directed towards the interior of the combustion chamber 1b in such a manner that a corner 11 is formed below the rim of the baffle between the baffle and the insert wall 12. The baffle rim 10 directed into the combustion chamber 1b may be flared downwards far enough for a straight line y which is tangent to the baffle rim to intersect the axis x of the combustion chamber 1b near the bottom 7b of the latter. In order to be able to retain any incompletely burnt fuel constituents in the combustion chamber 1b, it is necessary that the straight line y which is tangent to the rim 10 intersects the axis x inside the combustion chamber. With the baffle 9 designed with this form, any unburnt fuel constituents which due to the action of centrifugal forces tend to deposit on the walls of the insert 3 will be positively forced to rise gradually due to their inertia in the combustion chamber 1b and to leave the same past the rim 10 of the insert baffle. Since the intermediate member 5 of the combustion chamber 1b and, consequently, the insert 3b and the walls 12 can be controlled to suit the desired heat distribution pattern, it is possible, by the use of low thermal conductivity material for the intermediate member 5, to reduce temperature dissipation through the wall areas adjacent to the throat of the combustion chamber 1b so that these areas will attain the desired high temperature for optimum combustion of the unburnt constituents of the fuel. The physical construction of the intermediate member 5 may be similar to that of the first embodiment described and provided with thermal conductivities as indicated there.

As will be evident from the above, the features characterizing the present invention enable temperature control of the walls of the insert to be obtained according to the high or low thermal conductivity of the intermediate member in conformity with the desired heat distribution pattern. This makes it possible for the fuel constituents depositing on the walls of the combustion chamber to be heated to the optimum level at a faster rate, which is essential in high-speed internal combustion engines. As will also be evident from the foregoing description, in order to achieve the desired pattern of temperature control, the intermediate member may be provided with different heat conductivities in different areas. According to the present invention such zoned thermal conductivities can be achieved in a straightforward manner by making the intermediate member of a carbon substance. Carbon offers an advantage for this purpose in that it can be imparted different thermal conductivities in a simple manner because heating will transform carbon into, say, graphite, which has a high thermal conductivity, whereas if left as carbon it will have a poor or lower thermal conductivity.

An advantageous development of the invention consists in making the intermediate member near the level of the combustion chamber throat or close to the baffle with a low thermal conductivity, while in the area of the combustion chamber bottom or the far end of the insert it is made with a high or intermediate thermal conductivity.

It is, of course to be understood that the present invention is, by no means, limited to the specific shapes shown, but also comprises any modifications within the scope of the appended claims.

What we claim is:

1. A piston for injection type internal combustion engines, especially compression ignition engines, which has that side of its piston bottom which is intended in part to define the main combustion chamber provided with an axial chamber, and which includes an intermediate member inserted in said axial chamber and having zones of thermal conductivities with a predetermined heat distribution pattern, and an annular insert member for holding back unburned fuel material and so tempered to provide temperatures necessary for optimum combustion as inserted into said intermediate member and lining the inner surface thereof, that side of said annular insert member which faces the axis of said piston defining a substantially spherical supplemental combustion chamber open at both ends in axial direction of said piston and substantially coaxial with said piston.

2. A piston according to claim 1, in which said intermediate member has different thermal conductivities.

3. A piston according to claim 1, in which said intermediate member has constant thermal conductivities.

4. A piston according to claim 1, in which said intermediate member is made of carbon.

5. A piston according to claim 1, in which said supplemental combustion chamber has that end thereof which is adjacent said piston bottom side in part defining the main combustion chamber provided with a throat, and in which said intermediate member has a low thermal conductivity around said supplemental combustion chamber throat and has a higher thermal conductivity in the region of that end of said supplemental combustion chamber which is remote from the piston bottom surface intended in part to define the main combustion chamber.

6. A piston according to claim 1, in which said supplemental combustion chamber has that end thereof which is adjacent said piston bottom side in part defining the main combustion chamber provided with an inwardly curved flange forming an annular baffle, and in which said intermediate member has a relatively low thermal conductivity in the vicinity of said baffle and has a higher thermal conductivity at that end portion of said supplemental combustion chamber which is remote from said baffle.

7. A piston according to claim 1, in which said intermediate member is composed of a plurality of superimposed annular bodies respectively having different thermal conductivities, the lower thermal conductivity of said intermediate member being in the vicinity of that piston bottom side which is intended in part to define the main combustion chamber.

8. A piston according to claim 1, in which said intermediate member has an interface dividing said intermediate member along the contour of the insert, that part of the intermediate member which is adjacent said supplemental combustion chamber having a relatively high thermal conductivity, and another part of said intermediate member which is adjacent the piston body proper having a relatively low thermal conductivity.

9. A piston according to claim 4, in which the thermal conductivity of the carbon of said intermediate member is graduated so that a relatively high thermal conductivity prevails adjacent said insert member, and a lower thermal conductivity exists perpendicular to the piston axis.

10. A piston according to claim 9, in which to remove combustion chamber heat said relatively high thermal conductivity exists in the axial direction of said piston.

11. A piston according to claim 1, in which said intermediate member while having zones of different thermal conductivities form one single integral piece.

* * * * *